Figure 1:
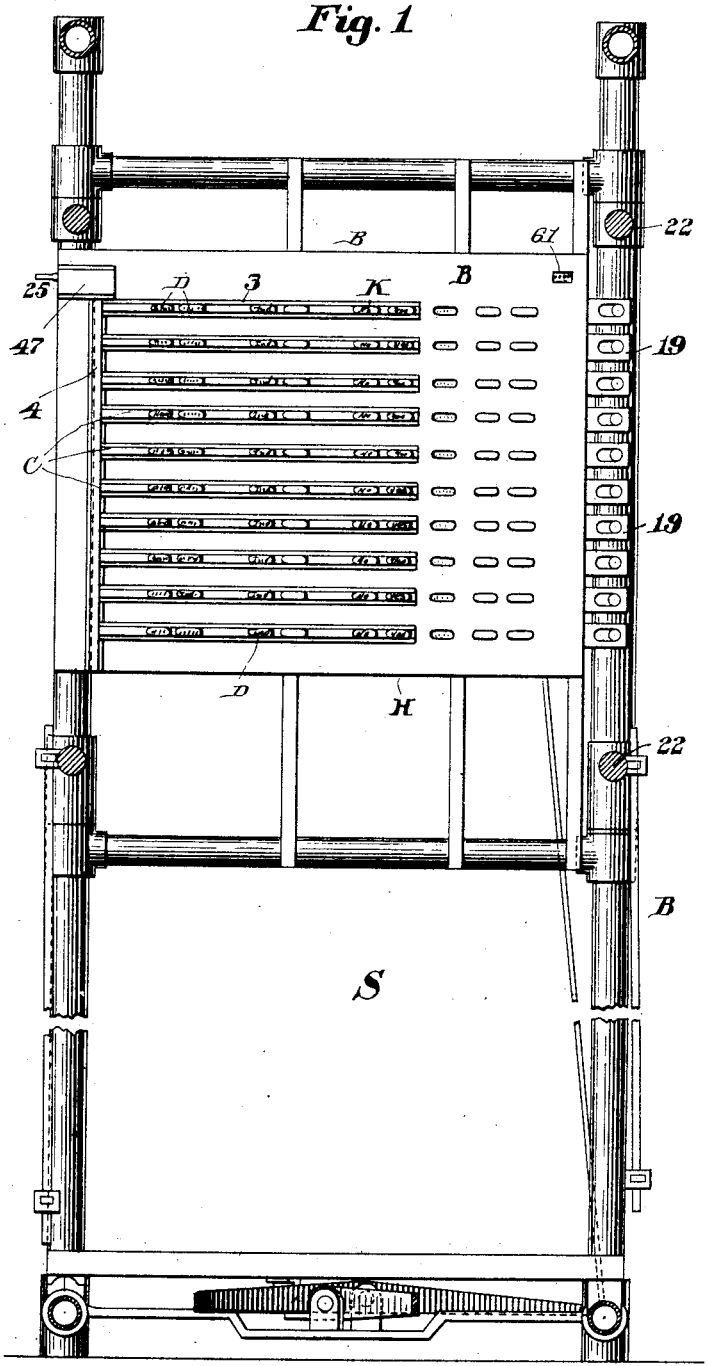

No. 694,765. Patented Mar. 4, 1902.
L. W. LUELLEN.
VOTING MACHINE.
(Application filed Feb. 1, 1901.)
(No Model.) 5 Sheets—Sheet 1.

Witnesses:
Walter E. Lombard
L. C. Wood

Inventor:
Lawrence W. Luellen,
by Whitney, Atty.

No. 694,765. Patented Mar. 4, 1902.
L. W. LUELLEN.
VOTING MACHINE.
(Application filed Feb. 1, 1901.)
(No Model.) 5 Sheets—Sheet 2.
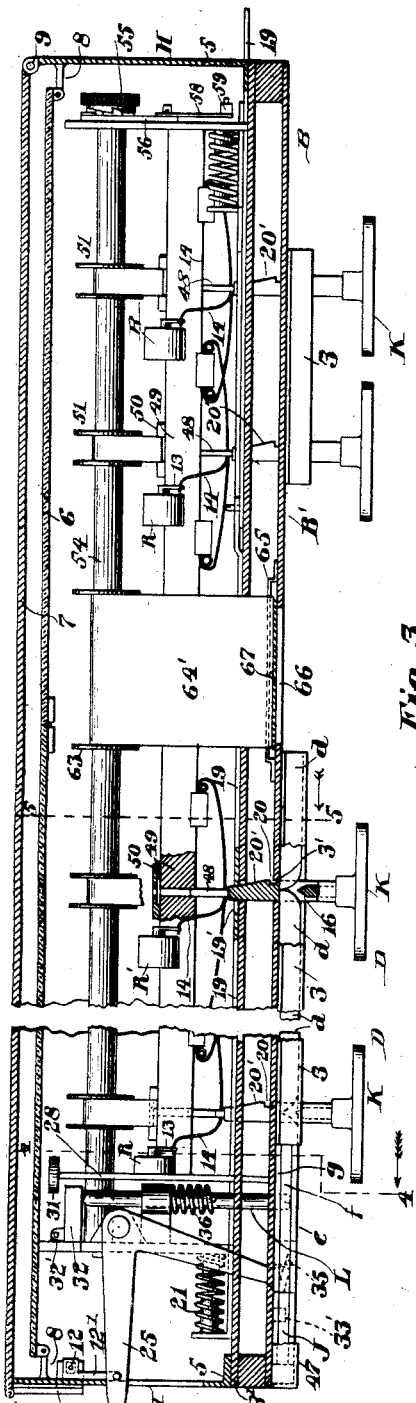
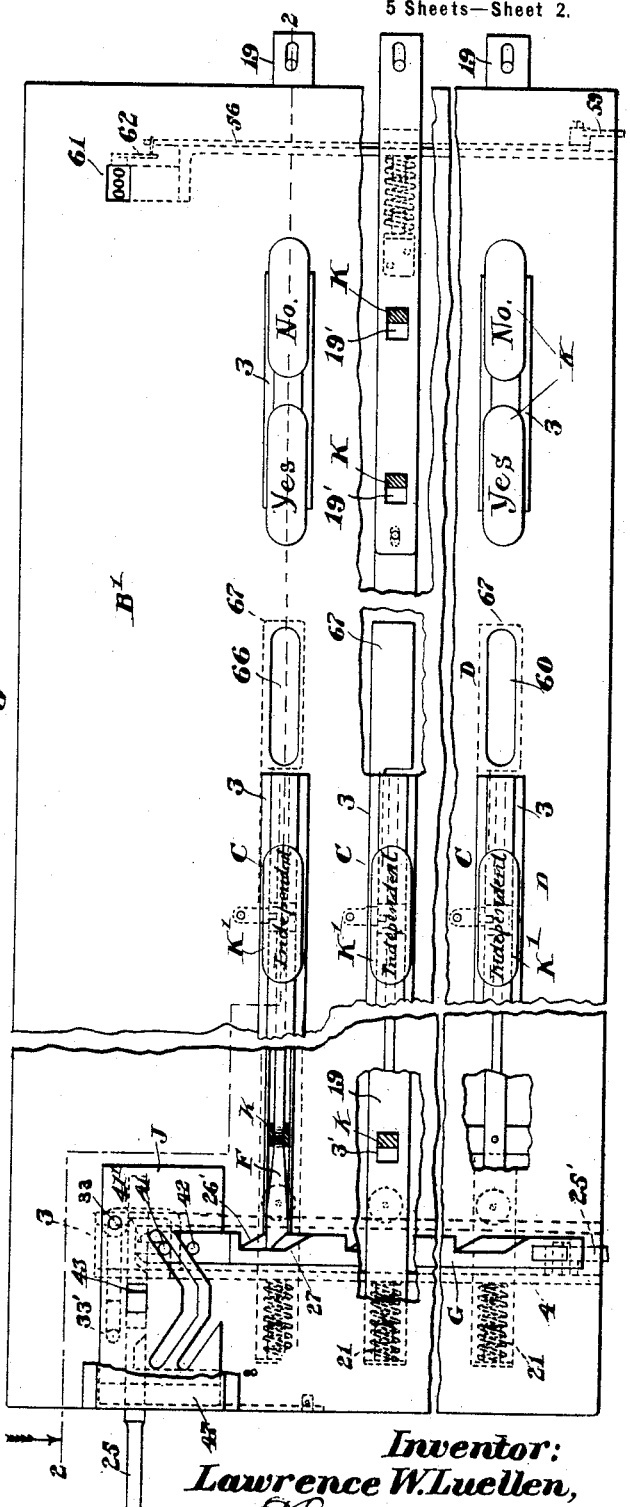
Witnesses:
Walter E. Lombard
L. C. Wood
Inventor:
Lawrence W. Luellen,
by Whitney, Atty.

No. 694,765. Patented Mar. 4, 1902.
L. W. LUELLEN.
VOTING MACHINE.
(Application filed Feb. 1, 1901.)
(No Model.)
5 Sheets—Sheet 3.
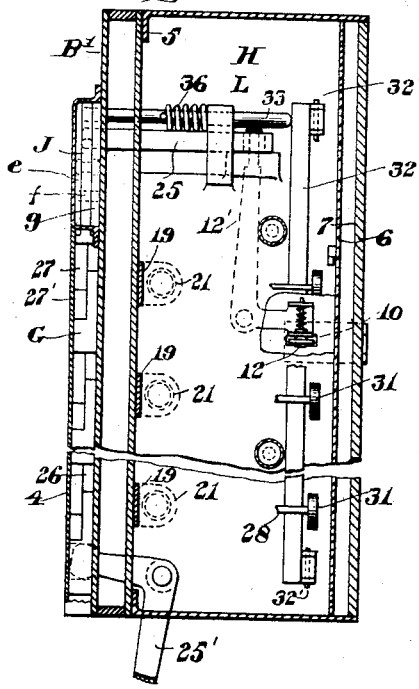
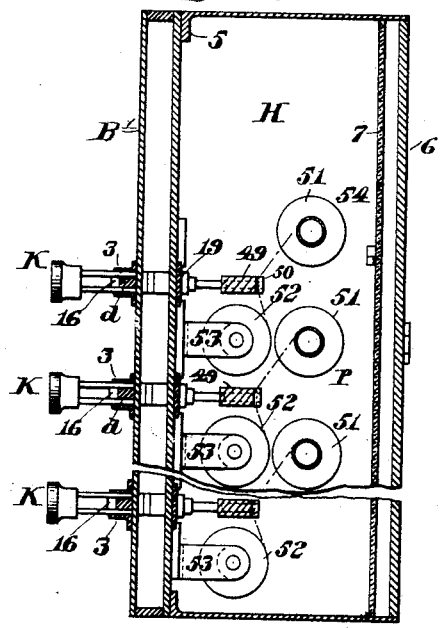
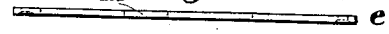
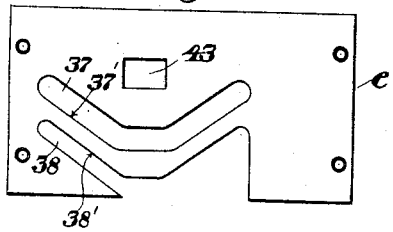
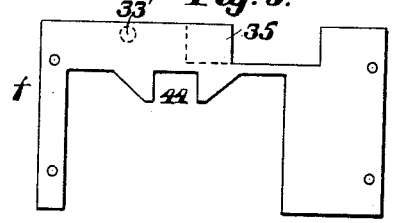
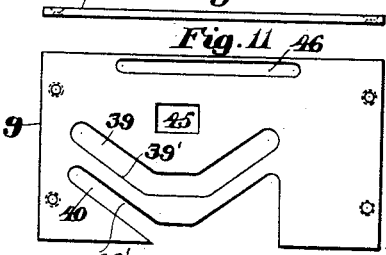
Witnesses:
Inventor:
Lawrence W. Luellen,
by
Atty.

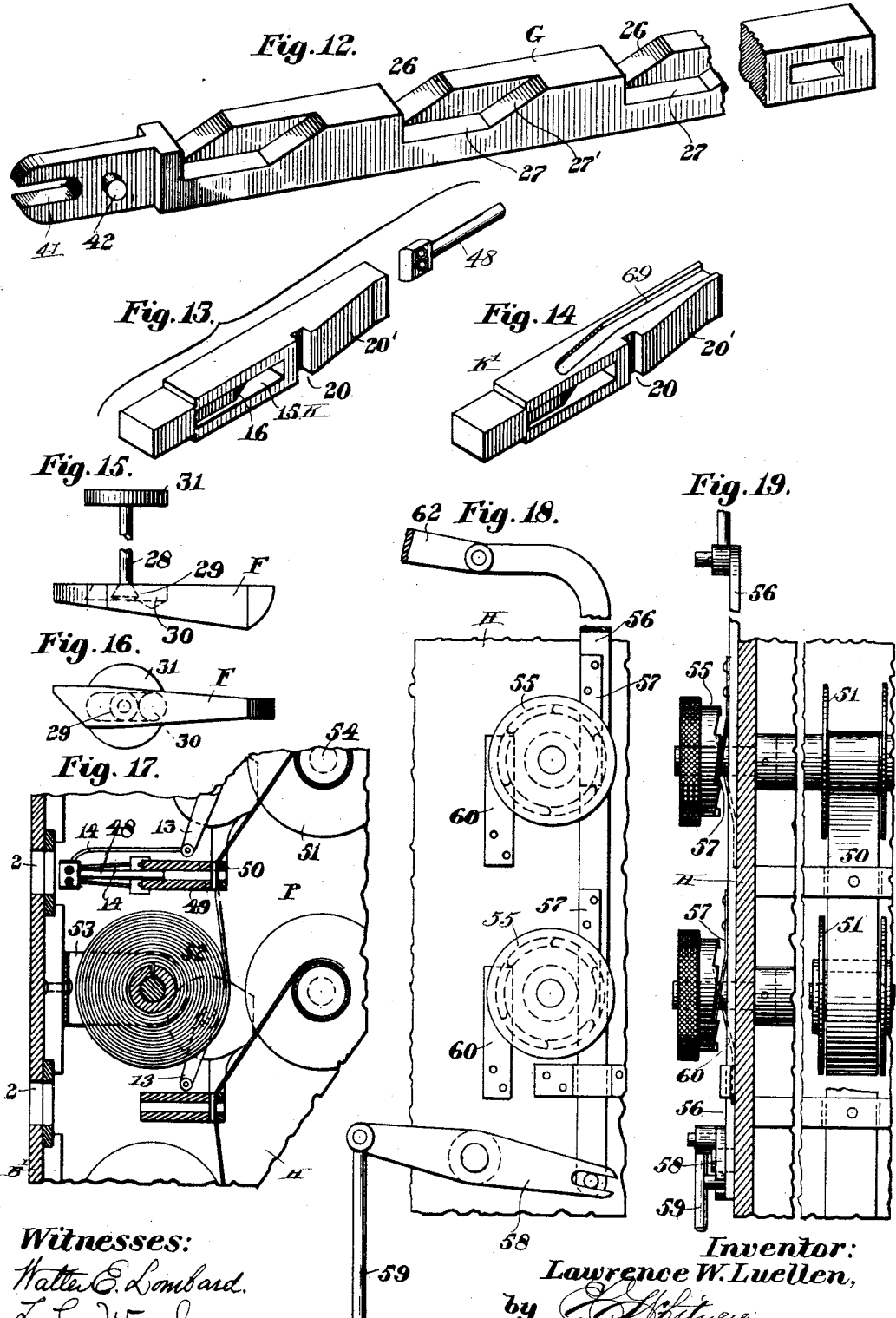

No. 694,765. Patented Mar. 4, 1902.
L. W. LUELLEN.
VOTING MACHINE.
(Application filed Feb. 1, 1901.)
(No Model.) 5 Sheets—Sheet 5.
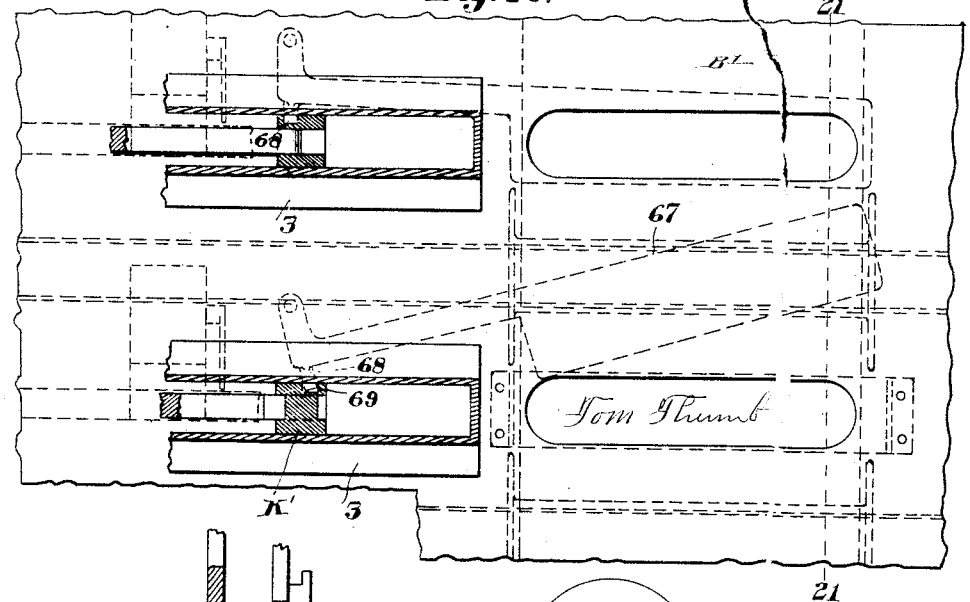
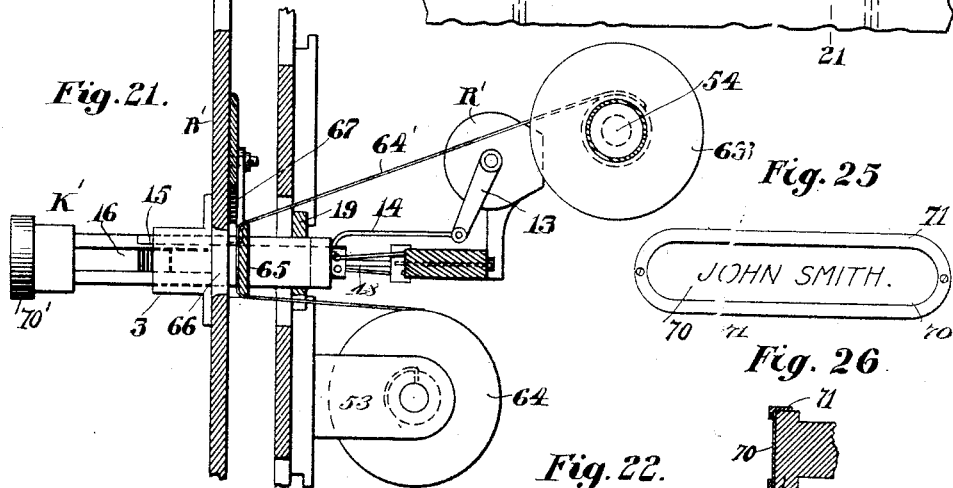
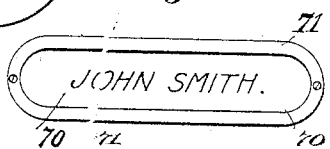
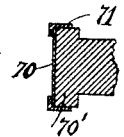
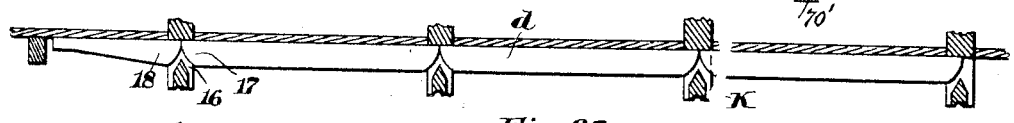
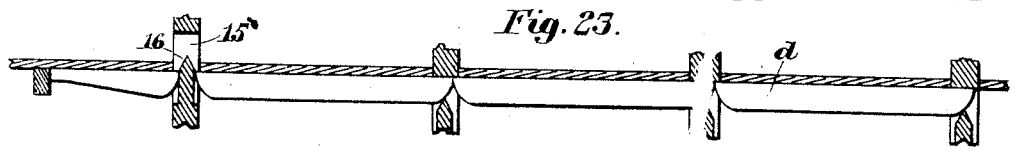
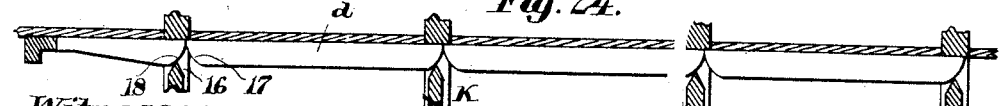
Witnesses:
Walter E. Lombard
L. C. Wood
Inventor:
Laurence W. Luellen,
by E. Whitney, Atty.

UNITED STATES PATENT OFFICE.

LAWRENCE W. LUELLEN, OF OLATHE, KANSAS.

VOTING-MACHINE.

SPECIFICATION forming part of Letters Patent No. 694,765, dated March 4, 1902.

Application filed February 1, 1901. Serial No. 45,617. (No model.)

*To all whom it may concern:*

Be it known that I, LAWRENCE W. LUELLEN, a citizen of the United States of America, and a resident of Olathe, in the county of Johnson and State of Kansas, have invented certain new and useful Improvements in Voting-Machines, of which the following is a specification.

This invention relates to voting-machines, an object of the invention being to produce an improved, simplified, durable, efficient, and accurately-operating voting-machine comprehending means for preventing malicious tampering therewith and also including, among other improvements, class-voting means, whereby all the candidate-voting devices of one or any selected number of office-voting mechanisms may be quickly locked against effective movement without interfering with the operations of the candidate-voting devices of the non-locked office-voting mechanisms by the attending judge upon the approach of a voter not entitled to vote for all the offices, thus obviating the necessity of providing separate booths for male and female voters in localities where women are entitled to vote for certain offices.

A further object of the invention is to provide in connection with each candidate-voting device an improved recording device, whereby a record independent of the vote-registering device is made for each voter, from which may be determined the exact candidates voted for by each voter, so that should a voter have his vote challenged just before the polls are closed he may be allowed to vote, and if it is proved after the polls are closed that he had no right to vote his vote could be ascertained and thrown out by the proper officials.

A further object of the invention is to provide in operative relation with the plurality of rows of office-voting mechanisms, each row including a series of counter-actuating keys, improved locking mechanism, including a reciprocatory locking-bar, common to the key of the several rows of office-voting mechanisms and effective for locking all the keys of one or more rows, and to provide inclosed automatically-operative means (accessible only to the proper officer having a key) for locking the bar in its key-locking position.

A further object of the invention is to provide in a voting-machine and in connection with a key-actuated registering device a web of paper or other suitable material on which may be written the name or names of one or more independent candidates, means, including a shutter actuated by a voting-key on advancing and retracting movements thereof, for exposing and covering a portion of said web, and automatically-operative means for advancing the web a predetermined distance to expose a different portion after each voter has registered his entire vote.

With these objects in view the invention consists in certain novel elementary features, in the construction and combination of the elements of the submechanisms, and in the coöperative specific combination and arrangement of the several submechanisms, substantially as hereinafter described, and more particularly pointed out in the claims.

In the drawings accompanying and forming part of this specification, Figure 1 is a front sectional elevation of a voting-booth containing a voting-machine and certain elements controlled by the platform and door of the booth for actuating certain parts of the voting-machine. Fig. 2 is a horizontal longitudinal section of a portion of the voting-machine, taken on a line corresponding with the dotted lines 2 2 in Fig. 3 looking in the direction of the arrow. Fig. 3 is a front view, partly in section, of a portion of the voting-machine as seen from below in Fig. 2, parts being broken away for the purpose of showing other parts more clearly. Fig. 4 is a vertical cross-section of the voting-machine, taken on a line corresponding with the dotted line 4 4 in Fig. 2, looking in the direction of the arrow, certain parts being broken away. Fig. 5 is a vertical cross-sectional view of a portion of the voting-machine, taken on a line corresponding with the dotted line 5 5 in Fig. 2 and looking in the direction of the arrow. Figs. 6 to 11, inclusive, are enlarged details, edge and side view groups, of the three elements of the "cam-plate" which control the reciprocatory movements of the class-voting or locking bar, the locking of said bar and the resetting operations of the throw-out devices for the key-locking dogs. Fig. 12 is a perspective view, on an enlarged scale, of the "class-voting" or locking-bar, a portion thereof being broken out. Fig. 13 is a perspective view of one of the counteractuating keys and one of the independent recording-device punches in coöperative relation with said key. Fig. 14 is a perspective view of one of the cam-grooved shutter-actuating keys. Figs. 15 and 16 are plan and front views, respectively, of one of the end key-locking dogs and the throw-out device in shiftable connection therewith, a portion of the stem of the throw-out device being broken out in Fig. 15. Fig. 17 is an enlarged cross-sectional detail of a portion of the voting-machine, showing certain elements of the independent recording device, including the web, web-carrying spools, perforated platen, and reactionary punch. Fig. 18 is an end view of the voting-machine, showing the actuating mechanism or devices for the spools of the independent recording devices, parts being broken away. Fig. 19 is a rear elevation, partly in section, of the parts shown in Fig. 18. Fig. 20 is a front elevation, partly in section, of a portion of the voting-machine, illustrating the mode of operation of the shutter which normally covers the web on which an independent candidate's name is to be written. Fig. 21 is a cross-sectional view of a portion of the voting-machine, taken on a line corresponding with the dotted line 21 21 in Fig. 20, showing one of the shutters in its closed position. Figs. 22, 23, and 24 are diagrammatic sectional details illustrating the operation of the key-locking dogs, the several figures showing the dogs in different positions; and Figs. 25 and 26 are front and sectional details of one of the keys, showing the name-plate and holding means therefor.

Similar characters indicate like parts in all the figures of the drawings.

In the preferred construction and organization thereof illustrated in the accompanying drawings the voting-machine proper comprises, essentially, a suitable frame B, including a base or keyboard B', a plurality of horizontally-disposed parallel rows of so-called "office-voting" mechanism C, each including a plurality of independently-operative so-called "candidate-voting" devices D and also including locking means, shown as shiftably-supported dogs, for limiting the number of candidate-voting devices to be operated in one row; means including a so-called "class-voting" or locking bar G, shiftably supported in coöperative relation with the end dogs of the entire series of office-voting mechanisms and adapted for locking all the candidate-voting devices of one or more selected rows of voting mechanisms arbitrarily against effective operation, whereby to limit the number of office-voting mechanisms to be operated; throw-out devices, (each of which is designated in a general way by F,) one in shiftable connection with the end dog of each row of office-voting mechanisms and each adapted for nullifying the effective relation between its respective office-voting mechanism and the locking-bar; a resetting device in operative relation with the throw-out devices; independent recording means, each designated by P, one in operative relation with each candidate-voting device and adapted on a vote-registering movement of each candidate for making a record separate from the register of said candidate-voting device for indicating the candidates voted for by the separate voters and each including a record-receiving web and a reactionary punch supported independent of and in position to be operated by a candidate-voting device; automatically-operative means for advancing all the webs of the independent recording devices a predetermined distance concurrently after the total vote of a voter has been registered; means including a web of paper and a key-actuated shutter for exposing said web whereby an independent candidate's name may be inscribed; inclosed automatically-operative means for locking the class-voting bar in its locking position, and a casing inclosing said locking means and the registers of the candidate-voting devices and including an inner and an outer door, the former of which is transparent and has an ordinary key-actuated lock, and the latter of which has an automatically-operative lock controlled by the class-voting-bar actuator, all of which will be hereinafter fully described.

The frame B of the voting-machine proper, which may be of any desired or suitable general construction for supporting the several operative parts, comprises, essentially, a keyboard or base B', composed, preferably, of two relatively separated parallel metal plates having a plurality of rows of preferably equidistant transverse key seats or openings 2 formed therethrough for receiving the counteractuating keys, (each of which is designated in a general way by K;) a plurality of horizontally-disposed channel-pieces (each designated by 3) secured to the front face of the keyboard and forming between them and the keyboard guiding-channels in which the key-locking dogs of the office-voting mechanisms are supported, and each channel-piece having a series of key-receiving openings 3' through the front wall thereof, registering with the key-receiving opening 2 in the keyboard, and a vertically-disposed channel-piece 4, secured to the keyboard adjacent the ends of and in coöperative relation with the channel-pieces 3 and forming between it and the keyboard a guiding-channel for receiving the locking-bar or class-voting bar which controls the operations of the several office-voting mechanisms, and said channel-piece 4 having a series of openings formed in the side wall thereof adjacent the horizontal channel-pieces 3 to facilitate the movements of the rows of locking-dogs.

The horizontal channel-pieces which cover and guide the locking element of the register-actuating keys and the channel-piece which covers and guides the class-voting bar will preferably be constructed of sheet metal and be somewhat U-shaped in cross-section and will have flanges whereby the same may be secured to the front face of the keyboard by screws (not shown) which may be extended through from the rear side of the keyboard into said flanges in any well-known manner to facilitate the ready removal of the channel-pieces by any one in authority when it is desired to have access to the locking elements and still prevent malicious tampering therewith by outsiders.

As illustrated in Figs. 2, 4, and 5 of the accompanying drawings, a casing (designated in a general way by H) will be provided for inclosing those operative parts of the voting-machine which project through or are located in the rear of the base or keyboard B'. This casing, which may be of any suitable box-like construction, will preferably be made of metal in the form of a rectangular shallow box open front and rear and having internal flanges 5 at its front edges, whereby the same is secured in any suitable manner to the rear face of the base or keyboard. For closing the rear opening of the casing the same is shown provided with two doors or closures 6 and 7, the inner one 6 of which is in the nature of a glass door and is hinged at one side to an inwardly-projecting flange 8 on the side wall of the casing and is provided at its opposite side with a key-operative lock, whereby the same may be locked in a closed position and opened by a key carried by the proper official. The outer door of the casing, which is also hinged at one side, as at 9, to the side wall of the casing, is provided with a catch 10, the opposite end thereof adapted to be engaged by a lock-bolt or latch 12, automatically operative by an element of the locking-bar-actuating means, as hereinafter more fully described.

Each office-voting mechanism C comprises a plural number of independently-operative candidate-voting devices D, disposed in a row, (the number in each row depending upon the number of candidates for each office,) and a plurality of locking-dogs $d$, shiftably supported in the channel-pieces in coöperative relation with the several candidate-voting devices and adapted on the operation of one candidate-voting device for locking all of the other candidate-voting devices in the same row against effective movement.

Each candidate-voting device D and the locking-dogs coöperating therewith are shown in the accompanying drawings of substantially the same general construction and organization as the same parts described in Patent No. 651,874, granted to me June 19, 1900, to which reference may be had, and each preferably consists of a reactionary key K, supported for reciprocatory movements in the transverse openings of the keyboard and channel-pieces, a register or counter R of any suitable construction supported within the casing H and having an actuating arm or member 13 and an actuating connector 14 between said arm and key K.

The key K in the form thereof shown is substantially rectangular in cross-section and has a transverse slot 15 therethrough, adapted to register with the channel of the channel-piece through which said key extends when the key is in its retracted or normal position, and has a locking-dog-spreading partition 16, having a tapered or beveled end terminating in and practically constituting an end wall of the transverse slot 15, said partition being adapted, on the advancing or counter-actuating movement of the key, for entering between the beveled end 17 and 18 of two adjacent locking-dogs, whereby to spread these locking-dogs apart, causing them to slide longitudinally of the channel and force the opposite ends thereof and the ends of the successive dogs into position for obstructing the entrance of the wedge-like partitions of all the other keys in the same row, as will be readily understood by reference to Figs. 22 and 23 of the accompanying drawings.

It is desired to state in the above connection that the present invention is not limited to the specific construction and organization of the parts of the candidate-voting devices illustrated in the accompanying drawings, as it will be obvious that these may be variously modified within the purview of this invention.

In connection with each row of keys there is provided key-locking means, shown as a reactionary locking-strip 19, supported for reciprocatory movements in the path of all the keys of the row and having elongated openings 19', through which said keys extend, and adapted when a key is depressed or advanced to its register-actuating position to engage in a lock-notch 20 in the side edge of the key and lock said key against return movement until said strip is shifted to a key-unlocking position, as spring 21 being provided in connection with one end of each locking-strip 19 for automatically imparting a key-locking movement to said strip. Each key has its side edge beveled, as at 20', to force the locking-strip forward against the action of the spring until the lock-notch 20 of said key registers with said strip, when the same will be retracted by the spring 21 and enter said lock-notch. The means for locking the key in its operated position is substantially the same as the corresponding means described in the patent referred to. Therefore the above brief description will suffice for an understanding of the construction and operation thereof.

It will be understood that when any key of a row is operated to register a vote all of the other keys of the same row are locked, through the medium of the locking-dogs, against effective movement, and the operated key is also locked by the strip 19 against return movement, so that one voter cannot register more than one vote for one office. After a voter has operated all the keys representing the several candidates for whom he wishes to vote, all of said keys being successively locked in their advanced position or operated position, it is necessary to release the keys and return the same to their normal positions ready to be operated by the next voter, and it is not desirable to do this until the first voter has left the booth, and to accomplish this end each key-locking strip 19 is operatively connected at one end, preferably to the entrance-door 22 of the booth S, as shown, for instance, in Fig. 1, the connection being such that upon an opening movement of the entrance-door by the next voter all of the locking-strips 19 will be shifted to a key-releasing position, allowing said keys to return to their normal retracted positions, the reactionary means for each key being herein shown as a spring engaging the inner end of said key, and in the present organization the spring also constitutes the actuating-connector 14 between the key and the actuating member 13 of the register or counter.

The locking-dogs d of each row are supported for limited reciprocatory movements in a horizontal plane, and when the keys are in their normal retracted positions the adjacent ends of the successive locking-dogs will abut against each other at points substantially in alinement with the tapered or beveled ends of the partitions of said keys, the ends of said dogs projecting at all times a certain distance within the slots of said keys, this being true even when a key is in its advanced dog-spreading position on account of said partition being narrower than the body of the key in the direction of movement of the dogs, so that on a retractive movement of an operated key the ends of the dogs will limit such retractive movements. The dog-spreading partitions of the keys are so disposed that the points or beveled ends will at all times be located in the path of dogs and constitute stop-abutments for limiting the movements of said dogs, as will be understood by reference to Figs. 22, 23, and 24 of the drawings.

For the purpose of arbitrarily locking one or more office-voting mechanisms, including the keys of the independent operative candidate-voting devices, against effective movements to permit certain offices to be voted to the exclusion of others I have provided means, including what is herein termed a "class-voting" or locking bar G, disposed in coöperative relation with the left-hand end dogs of the several rows of dogs and adapted on one movement thereof for shifting all the dogs of one or more selected rows into position (see Fig. 24) for locking all the keys of the selected row or rows against movement. This means comprises in addition to the locking-bar G, which is supported for vertical reciprocatory movements in the vertically-disposed channel-piece 3, a two-way cam-plate (designated in a general way by J) in operative connection with one end of said bar, an actuating-lever 25 in operative connection with the cam-plate J and adapted to impart a bar-reciprocating movement to said plate, and incidentally an automatically-operative locking device L for the cam-plate and independently-operative bar-shifting lever 25' in connection with the opposite end of said bar.

The locking-bar G has formed in that side face thereof adjacent the locking-dogs a plurality of adjacent rows of independent notches or recesses (here shown as two) 26 and 27, each preferably having cam-faces 26' and 27', one face being disposed in advance of the other in the direction of the length of the bar, the former notch 26 being adapted when the bar is in its normal position and all the locking-dogs of the several rows are set to permit operations of all the office-voting mechanisms for receiving the end dogs of the row of dogs adjacent thereto and for permitting spreading movements of the dogs of said rows. The notch 27 is located at one side the normal plane of the longitudinal reciprocatory movement of the locking-dog and constitutes a relief-space for facilitating key-locking or spreading movements of the dogs when the end dog of the row is shifted into alinement with said notch; so that when it is desired to lock certain office-voting mechanisms against effective movement without interfering with the effective movement of other office-voting mechanisms it is simply necessary to shift the points of the end dogs of those office-voting mechanisms it is desired to operate into alinement with relief notches or spaces 27, which will permit free movements of these dogs and shift the locking-bar upward, so that the cam-faces 26' of the notches 26 will force the end dogs of those rows it is desired to lock backward and lock all the keys of these rows. The points of the end dogs of certain rows will then be held against movement by the side face of the locking-bar, whereas other dogs will be free to move in the notches 27, and therefore removed from the influence of the locking device, as will be understood by a comparison of Figs. 3, 22, 23, and 24.

After the selected offices have been voted and it is desirable to render all the office-voting mechanisms operative for the next voter it is simply necessary to shift the locking-bar to its normal position, so that the notches 26 will come into horizontal alinement with all of the end dogs.

It will be noticed by reference to the drawings that two independently-operative devices or means are provided for actuating the locking-bar, one of which includes the lever 25', pivotally connected to the lower end of the bar, and the other of which includes the bell-crank lever 25 and the cam-plate J in connection with the upper end of the locking-bar. The lower bar-actuator is used when it is desired to limit the number of offices to be voted for and when it is desired to return the locking-bar to its normal mid-stroke position to facilitate the operations of all the office-voting mechanisms, and the other actuator is used when it is desired to lock all of the office-voting mechanisms against movement.

The means for nullifying the effective relation between any one of the rows of locking-dogs and the locking-bar comprises a plurality of throw-out devices, each of which is in shiftable connection with the left-hand end dog of each of said rows, these end dogs being designated by F, and in the form thereof shown consists of a key-like member having a shank or stem 28, supported for reciprocatory movements in the keyboard and having a dovetailed head 29 at the inner end thereof fitting a dovetailed elongated slot 30 in the rear face of the end dog, (see Figs. 15 and 16,) the stem being provided with a button 31 at the outer end thereof, whereby the same may be conveniently operated to shift the end dog laterally of the channel in which it slides into position to enter the recess 27 of the locking-bar. These throw-out devices permit the proper official before voting begins and while he has access to the mechanism to so arrange the end dogs with relation to the locking-bar that the sets of keys for one or more officials to which certain classes of citizens are not entitled to vote will become inoperative upon the shifting of the lever 25', as hereinafter described. Of course with the bar as shown having two series of notches the sets of which the end dogs have been moved into the plane of the notches 27 will be operative in all positions of the lever, while those remaining in the plane of the notches 26 may be locked by the election-officers upon the entrance into the booth of a person not eligible to vote for candidates for these predetermined offices.

As a means for resetting the throw-out devices there is provided a resetting device in operative relation with the buttons of all the throw-out devices, said resetting device being shown as a vertically-disposed bar 32, pivotally supported at 32' slightly in advance of the inner faces of the buttons 31 of said throw-out devices and in position to engage the inner faces of said buttons when the throw-out devices are in their advanced positions, so that when the bar 32 is thrown rearward by means hereinafter described all of the throw-out devices will be returned to their normal positions and will carry the end dogs with which they are connected into their normal positions in the cam-faced notches 26 of the locking-bar.

The means L for automatically locking the locking-bar G in position to prevent the operations of any of the office-voting mechanisms is shown as a reactionary lock bolt or pin having its forward end disposed to engage a lock-notch 33' in one member f of the compound cam-plate J, which member has a pin-retracting cam-face 35 disposed to engage the forward end of the pin and impart a retractive movement thereto at a predetermined point in the advancing movement of the cam-plate J or at that point in the movement of the cam-plate where the locking-bar G has arrived substantially at its mid-stroke position, the retractive movement of the locking device taking place intermediate the dog locking and releasing movements of said locking-bar, a spiral spring 36 being provided in connection with the lock bolt or pin for imparting a locking movement thereto. (See Figs. 2 and 3.) The automatically operative bar-locking means also constitutes in the construction and organization thereof shown in the accompanying drawings an actuator for the resetting device 32, the rear end of the lock-bolt bearing against the front face of the bar which constitutes the resetting device, as shown most clearly in Fig. 2.

It is distinctly to be understood that the invention is not limited to the specific construction and organization of the parts of actuating and locking means for the locking-bar, (illustrated in the accompanying drawings,) as these may be variously modified without departure from this invention.

The cam-plate J, which constitutes one element of the actuating means for and is in connection with the upper end of the locking-bar and which also controls, through the medium of the automatically-operative bar-locking device, the effective movement of the device which resets the throw-out devices, comprises in the preferred construction and organization thereof (shown most clearly in Figs. 2, 3, and 6 to 11, inclusive) three members, (designated in a general way by $e$, $f$, and $g$, respectively,) which are shown in the nature of flat plates secured together in superimposed relation with their outer edges substantially flush. The outer members $e$ and $g$ of said cam-plate J have corresponding two-way cam grooves or slots 37 38 and 39 40, respectively, forming the two-way cam-faces 37' 38' and 39' 40', respectively, the cam-faces of one member being in horizontal alinement with the cam-faces of the other member and cooperating with pins 41 and 42, the first being in the form of a roller extending through the cam-grooves 37 39 and through the slot 41' in the upper end of the locking-bar G, while the second, 42, is secured to the bar adjacent to the slot 41' and acts in the grooves 38 and 40 of the cam-plate. The roller-pin bearing in the bottom of the slot 41' acts on the bar with comparatively little friction to start it in motion at the beginning of movement of the cam-plate. This initial movement being effected, the pins 41 and 42 on a complete advancing movement of said cam-plate J will first impart a downward and then an upward movement to the locking-bar. The cam-faces of the two plates have two upwardly oppositely inclined portions connected at their lower ends by a straight portion which permits a limited movement of the cam-plate at the center of its throw without operating the locking-bar. The middle member $f$ of the cam-plate has an inclined cam-face 35, disposed to act when the cam-plate is near its mid-position to impart a retractive movement to the automatically-operative bar-locking device L, whereby through the medium of the resetting device 32 to reset the throw-out devices of the key-locking members intermediate the releasing of the locking movement of said bar. The middle member $f$ is cut away opposite the cam-grooves 37, 38, 39, and 40 of the two outside members to permit an unobstructed movement of the pins of the locking-bar, which extend into both outside plates, and all of the plates $e$, $f$, and $g$ have rectangular transverse openings 43, 44, and 45 in register with one another, through which extends the operating end of the bell-crank lever 25, which actuates the cam-plate. The inner member $g$ of the cam-plate has an elongated horizontal slot 46 therethrough to facilitate the movements of the reactionary pin 33 of the automatically-operative locking device L, and the central member $f$ has a lock-notch 33' to receive the end of said pin, as will be understood by comparison of the figures referred to in this paragraph.

The cam-plate J will be covered by a metal casing 47, (see Fig. 1,) which has a horizontal supporting and guiding face (not shown) on the interior thereof to facilitate the movements of said cam-plate and prevent accidental displacement thereof and malicious tampering therewith, said plate being secured to the front face of the keyboard in any suitable manner.

The bell-crank lever 25, which actuates the cam-plate, is pivotally connected intermediate its ends to a fixture of the frame for horizontal oscillatory movements and has a shiftable connection near one end thereof with the upper end of a latch-operating lever 12', which shown somewhat in the nature of a bell-crank lever pivotally supported intermediate its ends for vertical oscillation on a fixture of the frame and having the latch 12, which may be of any ordinary or suitable construction and which normally engages the catch 10 of the outer door 7 of the voting-machine casing, the construction and organization being such that on a bar-locking movement of the cam-plate-actuating lever 25 a door-releasing movement will be imparted to the latch 12.

The mechanism which is operated by the lever 25 is for use when the election is closed to permit the election-officers to see the record which has been made and at the same time to prevent tampering with the keys to falsify the returns. As this lever is shifted its first action is to cause the cam-faces at 37', 38', 39', and 40' to lower the locking-bar G until the end dogs are all in alinement with the notches 26. Then while the pins are moving in the horizontal portion of the cam-slot the incline 35 reaches the end of the locking-pin, which rides up it, and its opposite end pressing against the bar 32 swings it against the buttons 31, and thus actuates the throw-out devices, returning any end dogs which have been moved prior to the opening of the polls into the plane of the notches 27 back into the plane of the notches 26. When this is effected, the upwardly-inclined portion of the cam-grooves 37 will have come into cooperation with the pin 42 on the locking-bar and will then move it upward, causing all the end dogs to ride up the cam-face 26' and locking all the keys against movement. At the end of the travel of the cam-plate the notch 33' will have reached the pin, which will seat itself therein, and thus lock the cam-plate and prevent the lever 25 and the locking-bar from being oppositely moved to release the keys. During the last portion of the movement of the cam it will release the latch 12 through the connector 12' and permit the outer opaque doors to be opened, thus rendering visible through the transparent doors the figures recorded by all the registers. The inner doors, however, can only be opened by the authorized official holding the key to the lock thereof.

The lower actuator 25' for the locking-bar is shown as an ordinary bell-crank lever pivotally supported on the frame and having a shiftable connection with the lower end of the locking-bar.

For the purpose of producing a record (independent of the key-actuated register of each candidate-voting device) from which may be determined the exact candidates voted for by each voter, so in case of contest as to the voting rights of any particular voter his vote may be selected and thrown out if it be proven that he had no right to vote, I have provided in operative relation with each candidate-voting device an independent recording device, (designated in a general way by P,) which in the preferred construction and organization thereof (shown most clearly in Figs. 5 and 17 of the accompanying drawings) comprises a reactionary punch 48, supported for reciprocatory movements independent of the key K in position to be operated by said key; a horizontally-recessed punch support or die 49; a platen 50, disposed in advance of said punch-support in advance of said support and having a perforation in alinement with the punch; two spools 51 and 52, supported above and below respectively, the punch in different vertical planes; a tension device 53 in connection with and preferably constituting a support for the lower spool, it being here shown as a resilient bracket pressing with sufficient force against the spool to prevent its turning too freely; a web of paper secured at opposite ends to said spools, and actuating means for said spools.

In practice all of the upper spools will be disposed with their axes in alinement and will have a common support.

The means for actuating the spools of all the recording devices concurrently comprise a plurality of rods or shafts 54, one extending through the hubs of all of the upper spools in each row and to which said spools are secured, a ratchet-wheel 55, fixed to the outer end of each spool-supporting shaft, and a reciprocatory bar 56, having a plurality of spring-pawls 57, the free ends of which are disposed to engage the teeth of the ratchet-wheels of all the several shafts, respectively, whereby on one movement thereof each shaft will be rotated a predetermined distance to impart a web-advancing movement to the spool. The lower end of the actuating-bar 56 has a shiftable connection with one end of a rocking beam or lever 58, pivotally supported intermediate its ends on the casing and connected at its opposite end by means of a rod 59 to an actuating-lever operated by the platform of the booth S, so that on a movement of said platform in one direction the spools of all the independent recording devices will have a web-advancing movement imparted thereto, as described in another form in the patent referred to.

The independent recording means P differs from the recording means described in the patent referred to in that the punch is supported independent of the register-actuating key K. A tension device is provided in connection with one of the spools for retarding the movement of said spool and holding the web taut during the advancing movements, so the step-by-step movements of said web will be of corresponding lengths, and the spools have web-advancing movements positively imparted thereto by the reciprocatory actuating-bar 56 and pawl-and-ratchet means instead of through the medium of a roller-rotating spring and an escapement.

The ratchet-wheels 55 have a plurality of ratchet-teeth on the inner faces thereof, which are engaged by the spring-pawls at one side the axis of rotation of said wheels, and as a means for preventing accidental retractive or backward movement of the ratchet-wheel there is provided in operative relation therewith a plurality of holdback devices, (each of which is designated by 60,) which are shown as spring-pawls in frictional engagement with the teeth of the ratchet-wheels at the opposite side of the axes thereof, as shown most clearly in Fig. 18.

In connection with the keyboard there is provided a register 61, the actuating-arm 62 of which is in operative connection with the upper end of the recording-device-actuating bar 56, which register is adapted for indicating the numbers of the successive voters, said register being operated by the actuating-bar 56 on each effective movement thereof, so that at each successive step-by-step movement of the webs of the independent recording devices an effective movement will be imparted to the register 61.

In connection with each row of nominated-candidate-voting devices is an independent-candidate-voting device, which in the preferred construction and organization thereof illustrated most clearly in Figs. 20 and 21 of the accompanying drawings comprises, in addition to a key K' and a key-actuated register R', (which are similar in construction, organization, and operation of the same parts of the other candidate-voting devices,) two rotatably-supported spools 63 and 64; a platen or table 65, disposed in the rear of a transverse opening 66, formed in the front plate of the keyboard, preferably in horizontal alinement with the key K'; a web 64' of paper, secured at opposite ends to the spools 63 and 64 and extending over the front face of the table 65, between said table and front plate of the register; a shutter 67, pivotally supported on the keyboard for oscillatory movements between the web 64' and opening 66 of the keyboard and having a projection 68 disposed in a cam-groove 69, formed in the upper face of the key K', the construction of the cam-groove and the disposition of the shutter being such that on an inward registering movement of the key an opening movement will be imparted to the shutter to expose the web through the opening 66 and to allow the voter to write the name of the independent candidate upon the portion of the web exposed, and upon the return movement of the key a closing movement will be imparted to the shutter, the shutter being held against a web-exposing movement until the key is again forced inward. The spool 63 is fixed to one of the shafts 54 of the independent recording devices and is operated concurrently with said devices, as will be readily understood.

In voting-machines as heretofore constructed it has been customary to place the names of the candidates on the keyboard at the sides of the buttons to be pressed for registering the votes of said candidates, and it has been found in practice that mistakes have occurred in voting on account of the disposition of candidate-names in rows between adjacent buttons, the voter not knowing whether to press the button at the right or the left of said name, and to obviate possible mistakes and simplify the voting I have provided in direct connection with each key a candidate-name plate 70 and means (shown as a clip 71, see Figs. 25 and 26) for holding said plate in place on the key. Each key has an oblong horizontally-disposed plate-supporting portion 70', preferably rounded at the outer ends, and a name-plate 70, which may be of celluloid or other suitable material, with the name of the candidate impressed or printed thereon, is secured to the front face of the key, preferably by a clip or open frame 71, surrounding the edges of said key and secured thereto by screws or in any suitable manner.

I do not desire to limit myself to the particular construction and organization of name-plate and holding means illustrated in Figs. 25 and 26, as these may be variously modified without departure from this invention, it being obvious that the name of the candidate may be printed, stamped, or impressed directly upon the end of the key, or the name-plate might be a paper strip pasted or otherwise fastened to the end of said key within the purview of this invention.

I claim—

1. In a voting-machine, the combination with a series of rows of keys, of sets of locking-dogs therefor, a device capable of acting upon the dogs of a plurality of the rows to lock all the keys therein, selective devices whereby any one of the sets of dogs may be removed from the influence of said locking device, and means for simultaneously restoring all the selective devices to their normal position.

2. In a voting-machine, the combination with a plurality of keys, of a set of locking-dogs therefor movable toward and from the keys, means for moving one of the dogs independently in a plane intersecting that in which the key-locking movement occurs, a movable locking device coacting with these last-named dogs, and connecting mechanism whereby movement imparted to the locking device restores the independently-movable dog to its normal position.

3. In a voting-machine, the combination with a plurality of keys, of a set of dogs movable to lock certain of the keys, means for moving one dog independently of the key-locking movement, and mechanism coacting with the dog-moving means whereby said dog is restored to its normal position.

4. In a voting-machine, the combination with a plurality of keys, of a channel adjacent thereto, locking-dogs sliding longitudinally in said channel, a throw-out device for moving one of the dogs laterally of the channel, and a resetting-bar coacting with the throw-out device.

5. In a voting-machine, the combination with a series of rows of keys, of sets of locking-dogs therefor, a locking device provided with adjacent recesses of different size, selective devices whereby one of the dogs of the set may be made to operate in connection with one or another of the recesses, and means for simultaneously restoring all the selective devices to their normal position.

6. In a voting-machine, the combination with a series of rows of keys, of sets of locking-dogs therefor, a locking device provided with adjacent recesses of different size forming cam-faces, selective devices whereby one of the dogs of the set may be made to operate in connection with one or another of the cam-faces, and means for simultaneously restoring all the selective devices to their normal position.

7. In a voting-machine, the combination with a plurality of keys, of a set of locking-dogs therefor, a locking device provided with a plurality of recesses, and means for moving one of the dogs to permit it to occupy one or another of the recesses comprising a throw-out device and an independent resetting device coacting therewith.

8. In a voting-machine, the combination with a series of rows of keys, of sets of locking-dogs therefor, a locking device longitudinally movable into different positions and provided with a plurality of faces occupying different longitudinal planes with which at least one of the dogs of each set may coact, each of these faces being adapted to prevent movement of different groups of keys according to the position of the device, selective devices whereby any one of the sets of dogs may be removed from the influence of said locking device, and means for simultaneously restoring all the selective devices to their normal position.

9. In a voting-machine, the combination with a series of rows of keys, of sets of locking-dogs therefor, a device capable of acting upon the dogs of a plurality of rows to lock all the keys therein, selective devices whereby any one of the sets of dogs may be removed independently from the influence of said locking device, and a resetting device common to all the selective devices.

10. In a voting-machine, the combination with a plurality of keys, of a set of locking-dogs therefor, a locking device acting upon the dogs, and a member provided with a working face for actuating said locking device and with a working face to actuate means whereby it is itself locked.

11. In a voting-machine, the combination with a plurality of keys, of a set of locking-dogs therefor, a locking device acting upon the dogs, and a member provided with a cam-face for actuating said locking device and with a cam-face to actuate means whereby it is itself locked.

12. In a voting-machine, the combination with a plurality of keys, of a set of locking-dogs therefor movable toward and from the keys, throw-out devices for moving one of the dogs independently in a plane intersecting that in which the key-locking movement occurs, a locking device acting upon the dogs, and a member provided with a working face for actuating said locking device and with a working face to actuate means whereby it is itself locked.

13. In a voting-machine, the combination with a plurality of keys, of a set of locking-dogs therefor movable toward and from the keys, throw-out devices for moving one of the dogs independently in a plane intersecting that in which the key-locking movement occurs, a locking device acting upon the dogs, and a member provided with a working face for actuating said locking device and with a working face to actuate means whereby it is itself locked and to reset the throw-out devices.

14. In a voting-machine, the combination with a plurality of keys, of a set of locking-dogs therefor, a locking device acting upon the dogs, and a member provided with a cam-slot with which the locking device coacts adapted to move said locking device in opposite directions by a single movement.

15. In a voting-machine, the combination with a plurality of keys, of a set of locking-dogs therefor, a locking device acting upon the dogs and provided with a projection, a member provided with a two-way cam-slot one portion of which is engaged by the projection from the locking device, and a roller coacting with the locking device and the other portion of the slot.

16. In a voting-machine, the combination with a plurality of keys, of a set of locking-dogs therefor, a locking device acting upon the dogs, and a member provided with an inclined slot for actuating said locking device and with a straight slot having at its end a cam-face to actuate means whereby it is itself locked.

17. In a voting-machine, the combination with a plurality of keys, of a set of locking-dogs therefor, a locking device acting upon the dogs, and a member provided with an inclined slot for actuating said locking device and with a straight slot having at its end a cam-face to actuate means whereby it is itself locked and with a depression in the line of the slot beyond the cam-face.

18. In a voting-machine, the combination with a plurality of keys, of a set of locking-dogs therefor, a locking device acting upon the dogs, a member provided with a cam-face for actuating said locking device and a second cam-face and depression adjacent thereto, and a spring-pressed pin coacting with the last-named cam-face and with the depression.

19. In a voting-machine, the combination with a series of rows of keys, of sets of locking-dogs therefor, a locking device capable of acting upon the dogs of a plurality of the rows, means for moving said locking device to lock certain of the rows of keys against movement, and independent means for moving said device to lock all the keys against movement.

20. In a voting-machine, the combination with a series of rows of keys, of sets of locking-dogs therefor, a locking device capable of acting upon the dogs of a plurality of the rows, a cam-plate coacting with the locking device, a lever for moving the cam-plate, and a second lever acting directly upon the locking device.

21. In a voting-machine, the combination with a casing containing registering devices, of a closure therefor, a lock for the closure, a plurality of keys operable outside the casing, and means for simultaneously unlocking the closure of the casing and locking the keys against movement.

22. In a voting-machine, the combination with a casing containing registering devices, of an inner and outer closure therefor, a key-operated lock for the inner closure, a lock for the outer closure, a lever for operating the lock of said outer closure, and a lock for said lever.

23. In a voting-machine, the combination with a casing containing registering devices, of an inner and outer closure therefor, a key-operated lock for the inner closure, a lock for the outer closure, a lever for operating the lock of said outer closure, and an automatic lock for said lever.

24. In a voting-machine, the combination with a casing containing registering devices, of an inner and an outer closure therefor, a key-operated lock for the inner closure, a lock for the outer closure, a lever for operating the lock of said outer closure, and an automatic lock for said lever releasable only from within the casing.

25. In a voting-machine, the combination with a casing containing registering devices, of a transparent inner and an opaque outer closure therefor, a key-operated lock for the inner closure, a lock for the outer closure, a lever for operating the lock of said outer closure, and a lock for said lever.

26. In a voting-machine the combination, with a plurality of rows of independently-operative candidate-voting devices, and with means for limiting the number of devices to be operated in the same row, of means including a reciprocatory locking-bar for locking all the voting devices of one or more rows; automatically-operative means for locking the bar in its device-locking position; and a casing inclosing the last-mentioned means and having a normally locked door.

27. In a voting-machine the combination, with a row of independently-operative candidate-voting devices, of a train of separable dogs for limiting the number of voting devices to be operated at one time; a bar supported for reciprocatory movements in a path intersecting the path of the locking-dogs and having a cam-face for shifting the locking-dogs into positions for locking all the voting devices against effective movements; a lever in operative connection with said bar and effective for actuating the same; and automatically-operative means for locking the bar in its locking position.

28. In a voting-machine, a series of reactionary counter-operating keys disposed in a row; a train of dogs for limiting the number of keys to be operated at one time; a bar supported for reciprocatory movements in a path intersecting the path of the train of dogs and having a cam for shifting the dogs into position for locking all the keys of the row; actuating means including a pivoted lever in connection with said bar; a reactionary detent for automatically locking the bar in its key-locking position; and a casing having a normally locked door inclosing the detent, whereby the detent cannot be retracted without unlocking and opening the door of the casing.

29. The combination with a plurality of rows of independently-operative vote-registering devices and with a plurality of trains of locking-dogs, each train effective for limiting the number of vote-registering devices to be operated in each row; a reciprocatory locking-bar common to the several trains of locking-dogs and having a series of cam-faces disposed in coöperative relation with the end dogs of the several trains; selective throw-out devices in shiftable connection with the end dogs of the several trains and adapted for shifting said end dogs out of, and into, the path of the cam-faces of the locking-bar to permit selected rows of vote-registering devices to be locked by the bar against effective movement while leaving others free for operation; locking-bar-actuating means; and means operated by the locking-bar-actuating means for returning the throw-out devices and end dogs to their normal positions at a predetermined point in the movement of the locking-bar.

30. In a voting-machine a plurality of rows of keys; a plurality of trains of dogs for limiting the number of keys to be operated in each row at one time; a reciprocatory locking-bar having a plurality of cam-faces disposed in the normal path of and coöperative with the end dogs of the trains and adapted for shifting the trains into position for locking all the keys; a throw-out device in shiftable connection with the end dog of each train and adapted for shifting the outer end of said dog out of operative relation with the cam-face of the locking-bar, whereby on a locking movement of the bar all of the keys of one or more selected rows will be locked against effective movements without interfering with the effective movements of the other rows; two independently-operative bar-actuating devices, one adapted for imparting a vertical locking movement to said bar, and the other adapted for first imparting a dog-releasing movement to said bar, and a subsequent dog-locking movement to said bar; means operative intermediate the dog releasing and locking movements of the last-mentioned bar-actuating device for returning the throw-out devices to their normal positions; and an automatically-operative locking device for the locking-bar.

31. In a voting-machine the combination, with a suitable base, of a plurality of horizontally-disposed parallel channel-pieces secured to the base; a vertically-disposed channel-piece secured to the base and intersecting the planes of all the horizontal channel-pieces; a plurality of rows of register-actuating keys extending through the horizontal channel-pieces respectively; a plurality of trains of dogs supported for movement in each horizontal channel-piece and adapted for limiting the number of keys to be operated in each row; means for temporarily locking operated keys in their advanced position; automatically-operative means controlled by the door of the voting-booth for releasing the operated keys; a locking-bar supported for reciprocatory movements in the vertical channel-piece and having cam-faces coöperative with the end dogs of the several trains for locking all the keys of one or more rows in their normal retracted positions and against effective movements; and means for actuating said bar.

32. In a voting-machine the combination, with a plurality of key-locking dogs supported for movements in parallel horizontal planes, and with a cam-faced bar for imparting key-locking movements to said trains of dogs, of arbitrarily-operative throw-out devices for nullifying the effective relation between one or more trains of dogs and the locking-bar; locking-bar-actuating means; and means operative by the locking-bar-actuating means at a predetermined point in the movement thereof, for resetting the throw-out devices and bringing all the trains of dogs into effective relation with said bar.

33. In a voting-machine the combination, with a plurality of trains of key-locking dogs, and with a cam-faced bar for imparting key-locking movements to said dogs, of a throw-out device in shiftable connection with the end dog of each train and effective for nullifying the effective relation between each train and the locking-bar; a two-way cam in operative connection with one end of the locking-bar; a lever for advancing and retracting the cam, whereby on the first part of the advancing movement thereof an ineffective or dog-releasing movement will be imparted to the locking-bar and upon the last part of said movement a dog-shifting movement will be imparted to said bar; means operative intermediate these two movements of the locking-bar for operating the throw-out devices to reestablish an effective relation between all the dogs and locking-bar; and means operative at the end of the last movement of bar for locking said bar.

34. In a voting-machine the combination, with a plurality of rows of key-locking dogs and with means including a locking-bar for imparting locking movements to said dogs, of a casing having a normally locked door; an actuator for the bar disposed to be operated outside the casing; and an automatically-operative bar-locking device disposed inside the casing and effective for locking the bar against a second operation until the door of the casing is unlocked.

35. In a voting-machine the combination, with a plurality of rows, of candidate-voting devices and with means, including a locking-bar and a bar-actuator, for locking all the devices of any one or more rows against effective movement, of a casing having inner and outer normally locked doors; an automatically-operative bar-locking device disposed inside the casing and effective for locking the bar against a second operation until the inner door of the casing is unlocked; and means operative by the bar-actuator, on predetermined movements thereof, for locking and unlocking one of the casing-doors.

36. In a voting-machine the combination, with a train of horizontally-disposed key-locking dogs, of a locking-bar shiftably supported in a path intersecting the path of the train of dogs and having means for imparting a key-locking movement to said train; a horizontally-movable bar-actuating cam-plate having a two-way cam-face in engagement with a pin or projection on the bar and adapted, on one movement thereof, for imparting a complete reciprocation to said bar; a pivotally-supported bell-crank lever in shiftable connection at one end with said cam-plate; and automatically-operative means for locking the bell-crank lever at the end of its stroke.

37. In a voting-machine the combination, with a train of horizontally-disposed key-locking dogs, of a locking-bar shiftably supported in a path intersecting the path of the train of dogs and having means for imparting a key-locking movement to said train; a horizontally-movable bar-actuating cam-plate having a two-way cam-face in engagement with a pin or projection on the bar and adapted on one movement thereof for imparting an releasing and locking movement to said bar; a pivotally-supported bell-crank lever in shiftable connection at one end with said cam-plate; a throw-out device in connection with the end dog of the train and adapted for nullifying and reëstablishing an effective relation between the train and locking-bar; an inclosed spring-actuated pin for automatically locking the cam-plate at the end of its advancing movement; and means controlled by the locking-pin and cam-plate, and operative intermediate the bar releasing and locking movements of said plate and preparatory to the locking movement of said pin, for resetting the throw-out device to reëstablish an effective relation between the train of dogs and locking-bar.

38. In a voting-machine a plurality of key-actuated counters in combination with a plurality of independent recording devices, one for each key and each comprising a reactionary punch supported independent, and in the path of movement, of a key; a perforated platen disposed in advance of said punch; a web of paper passing between the punch and platen and having its opposite ends secured to spools one of which is disposed below the other; a combined supporting and tension device for one of said spools, including spring-arms in bearing engagement with opposite faces of said spool and adapted for restricting the rotative movement thereof; and means for rotating the other spool of this recording device and the corresponding spools of all the other recording devices concurrently and automatically after each operation of the punch.

39. In a voting-machine the combination, with a base having a web-exposing opening therethrough, and with a plate disposed in the rear of said opening, of a web of paper extending between the plate and base and adapted to be exposed through said opening; a shutter for said opening; a key for moving said shutter toward and from the opening and means for advancing the web after the key has returned to its normal shutter-closing position.

40. In a voting-machine the combination, with a base or keyboard having a web-exposing opening therethrough; a plate in the rear of said opening; a pivotally-supported shutter disposed for oscillatory movements between the plate and keyboard; a web of paper supported for longitudinal movements between the shutter and plate; a reactionary counter-operating key in connection with, and adapted for imparting web covering and uncovering movements to, the shutter; means for locking the key in its advanced position; automatically-operative means for releasing said key whereby to return the shutter to its web-covering position; spools in connection with opposite ends of said web; and means operative automatically, after the return movement of the key, for advancing the web a predetermined distance.

41. The combination with a keyboard having a web-exposing slot therein; a shutter pivotally connected to the rear face of said keyboard and adapted normally for closing said slot; a counter-actuating key extending through the keyboard and having a cam-groove in the face thereof coöperating with a projection on the shutter and adapted for imparting opening and closing movements to said shutter on advancing and retracting movements of said key; a web supported for traveling movements in the rear of the shutter and adapted to be exposed through said slot; and automatically-operative means for advancing said web after the shutter is returned to its slot-closing position.

Signed by me at Hartford, Connecticut, this 19th day of January, A. D. 1901.

LAWRENCE W. LUELLEN.

Witnesses:
E. C. WHITNEY,
LESLIE C. WOOD.